United States Patent
Sung et al.

(10) Patent No.: US 10,524,158 B2
(45) Date of Patent: *Dec. 31, 2019

(54) DETERMINING NETWORK CONGESTION BASED ON TARGET USER THROUGHPUT

(71) Applicant: T-Mobile USA, Inc., Bellevue, WA (US)

(72) Inventors: Hui-Hsia Sung, Seattle, WA (US); Marie Grace Jacinto, Bellevue, WA (US); Khrum Kashan Jat, Sammamish, WA (US); Gary Dousson, Seattle, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/297,537

(22) Filed: Mar. 8, 2019

(65) Prior Publication Data

US 2019/0208440 A1    Jul. 4, 2019

Related U.S. Application Data

(60) Continuation of application No. 15/865,104, filed on Jan. 8, 2018, now Pat. No. 10,231,147, which is a division of application No. 15/087,994, filed on Mar. 31, 2016, now Pat. No. 9,867,080.

(51) Int. Cl.
*H04W 28/02* (2009.01)
*H04W 24/02* (2009.01)
*H04W 24/04* (2009.01)

(52) U.S. Cl.
CPC ....... *H04W 28/0284* (2013.01); *H04W 24/02* (2013.01); *H04W 24/04* (2013.01); *H04W 28/0289* (2013.01)

(58) Field of Classification Search
CPC ............. H04W 28/0284; H04W 24/04; H04W 28/0289; H04W 24/02
See application file for complete search history.

(56) References Cited

U.S. PATENT DOCUMENTS

| | | | | |
|---|---|---|---|---|
| 5,752,164 | A * | 5/1998 | Jones | H04B 1/38 379/29.01 |
| 7,764,967 | B2 * | 7/2010 | Kim | H04W 16/04 455/447 |
| 9,642,066 | B2 | 5/2017 | Ljung et al. | |
| 9,867,080 | B2 | 1/2018 | Sung et al. | |
| 10,231,147 | B2 | 3/2019 | Sung et al. | |
| 2007/0281710 | A1 * | 12/2007 | Bai | H04W 16/10 455/452.1 |
| 2010/0202305 | A1 * | 8/2010 | Wijting | H04W 16/14 370/252 |
| 2011/0051709 | A1 * | 3/2011 | Roberts | H04W 24/00 370/339 |

(Continued)

*Primary Examiner* — Lewis G West
(74) *Attorney, Agent, or Firm* — Perkins Coie LLP

(57) ABSTRACT

Systems and methods for determining network congestion (e.g., reduced or low average user throughput with telecommunications networks, such as LTE networks, are described. The systems and methods described herein facilitate the identification and/or prediction of congestion at cell sites, which may enable telecommunications networks to prevent and/or remedy current or future occurrences of congestion at cell sites within their networks.

20 Claims, 7 Drawing Sheets

(56) References Cited

U.S. PATENT DOCUMENTS

| | | | |
|---|---|---|---|
| 2011/0211652 A1* | 9/2011 | Debbah | H04J 11/003 |
| | | | 375/295 |
| 2013/0203401 A1* | 8/2013 | Ryan | H04W 24/08 |
| | | | 455/422.1 |
| 2013/0272274 A1* | 10/2013 | Ishida | H04W 72/082 |
| | | | 370/336 |
| 2014/0092734 A1* | 4/2014 | Ljung | H04W 28/0205 |
| | | | 370/230 |
| 2014/0155071 A1* | 6/2014 | M | H04W 36/08 |
| | | | 455/438 |
| 2014/0179335 A1* | 6/2014 | Pikhletsky | H04W 72/04 |
| | | | 755/452.2 |
| 2015/0289141 A1* | 10/2015 | Ghasemzadeh | H04W 16/14 |
| | | | 370/330 |
| 2016/0021650 A1* | 1/2016 | Chembil-Palat | H04W 8/005 |
| | | | 455/434 |
| 2016/0183296 A1* | 6/2016 | Yerramalli | H04W 16/14 |
| 2017/0289840 A1 | 10/2017 | Sung et al. | |
| 2018/0227795 A1 | 8/2018 | Sung et al. | |

\* cited by examiner

DETERMINING NETWORK CONGESTION BASED ON TARGET USER THROUGHPUT

CROSS-REFERENCE TO RELATED APPLICATIONS

This application is a continuation of U.S. patent application Ser. No. 15/865,104, titled "DETERMINING NETWORK CONGESTION BASED ON TARGET USER THROUGHPUT," filed Jan. 8, 2018, now U.S. Pat. No. 10,231,147; which is a division of U.S. patent application Ser. No. 15/087,994, titled "DETERMINING NETWORK CONGESTION BASED ON TARGET USER THROUGHPUT," filed Mar. 31, 2016, now U.S. Pat. No. 9,867,080, both of which are hereby incorporated by reference in their entireties.

BACKGROUND

A telecommunications network is established via a complex arrangement and configuration of many cell sites that are deployed across a geographical area. For example, there may be a large group of cell sites, each having multiple antennas pointing in different directions, set up across a specific geographical location (e.g., a city, neighborhood, and so on), in order to provide adequate, reliable coverage for mobile devices (e.g., smart phones, tablets, and so on) seeking access to the telecommunications network and the services provided by the network, such as services that facilitate the transmission of data over the network.

Mobile electronic devices (such as smart phones, personal digital assistants, computer tablets, and so on) are ubiquitous. Mobile devices provide advanced computing capabilities and services to users, such as voice communications, text and other messaging communications, video and other multimedia communications, streaming services, and so on. Often, users, via their mobile devices, access such services as customers or subscribers of telecommunications carriers, which provide telecommunications networks within which the users make voice calls, send text messages, send and receive data, and so on.

However, problems may arise when many device attempt to transmit and receive data via the limited bandwidth capacity provided by cell sites. When too many devices are sending and receiving data, congestion may occur, where any further increases in data traffic often results in smaller or reduced throughput at the cell sites.

BRIEF DESCRIPTION OF THE DRAWINGS

Embodiments of the present technology will be described and explained through the use of the accompanying drawings.

Figure 1:
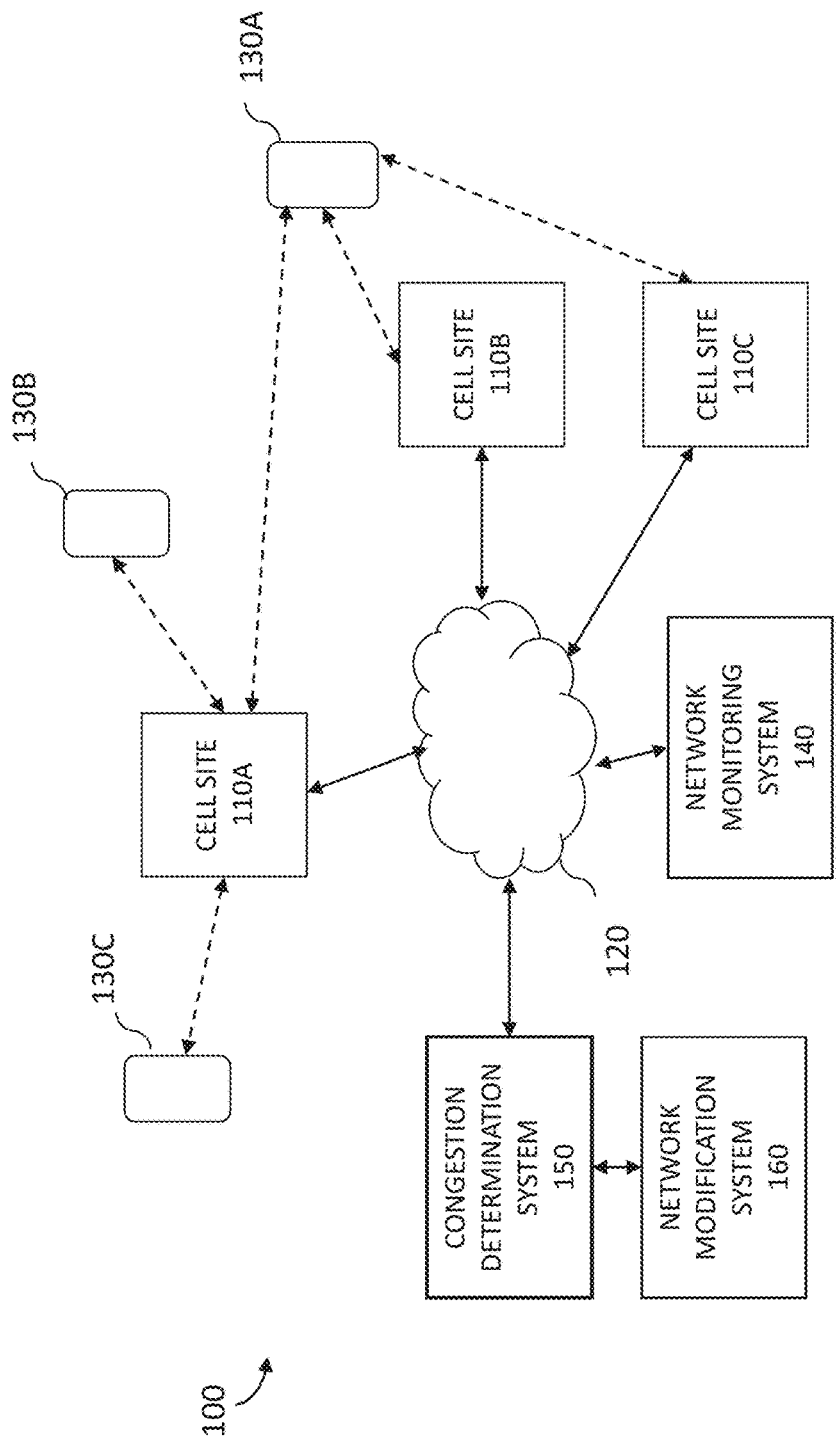
FIG. 1 is a block diagram illustrating a suitable computing environment within which to determine congestion within a telecommunications network

The drawings have not necessarily been drawn to scale. Similarly, some components and/or operations may be separated into different blocks or combined into a single block for the purposes of discussion of some of the embodiments of the present technology. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

Systems and methods are described herein for determining throughput (e.g., congestion) at cell sites within LTE (Long-term Evolution) and other telecommunications networks. As described herein, when a cell site is congested, the throughput at the cell site is reduced or minimized, which causes problems associated with transmitting and receiving data via the cell site. The systems and methods described herein, therefore, facilitate the identification and/or prediction of congestion at cell sites, which may enable telecommunications networks to prevent and/or remedy current or future occurrences of congestion at cell sites within their networks.

In some embodiments, the systems and methods measure a spectrum utilization percentage for physical resource blocks associated with a cell site of a telecommunications network, measure a number of users connected to the telecommunications network via the cell site, and/or measure a spectral efficiency of the cell site. Using the various measurements, the systems and methods determine the cell site is congested when the spectrum utilization percentage for the physical resource blocks associated with the cell site, the number of users connected to the telecommunications network via the cell site, and/or the measured spectral efficiency of the cell site is above certain threshold values associated with congestion of the cell site.

For example, the spectrum utilization percentage of the cell site, the number of users connected to the telecommunications network, and the measured spectral efficiency of the cell site may indicate the cell site is providing an average user throughput of less than 2 Mbps (or another predetermined threshold throughput associated with minimum data transmission capabilities) within an LTE network, and is therefore congested. Other criteria and/or thresholds may be utilized for other networks.

Thus, in some embodiments, the systems and methods identify or predict congestion at a cell site (or, sectors of a cell site) by measuring certain characteristics or data traffic parameters of the cell site, and without directly measuring the throughput of the cell site (e.g., without utilizing a test transmission of data via the cell site).

In the following description, for the purposes of explanation, numerous specific details are set forth in order to provide a thorough understanding of embodiments of the present technology. It will be apparent, however, that embodiments of the present technology may be practiced without some of these specific details.

Examples of Suitable Telecommunications Networks

As described herein, in some embodiments, the systems and methods identify and/or predict congestion at a cell site, such as a cell site within an LTE telecommunications network. FIG. 1 is a block diagram illustrating a suitable computing environment 100 within which to identify, predict, and/or perform actions associated with different throughput levels (e.g., congestion) at cell sites within a network.

Multiple mobile devices 130A-C or user equipment (UE), associated with users, such as mobile phones (e.g., smartphones), tablet computers, laptops, and so on, receive and transmit data, and/or perform other communications over a telecommunications network 120, via one or more cell sites 110A-C. For example, many mobile devices, including mobile devices 130A-C, may access cell site 110A at a location that includes cell site 110A, in order to transmit and receive data (e.g., stream or upload multimedia content) from various entities via the cell site 110A.

The cell sites 110A-C may be base stations, picocells, macrocells, femtocells, and/or other network access components. The cell cites 110A-C may store data associated with their operations, including data associated with the number of types of connected users, data associated with the utilization of a spectrum provided by the cell sites 110A-C, and so on. The cell sites 110A-C may monitor their use, such as the provisioning or utilization of physical resource blocks (PRBs) provided by a cell site physical layer. For example, a cell site 110A having a channel bandwidth of 5 MHz provides 25 available physical resource blocks through which data may be transmitted to/from the mobile devices 130A-C.

Other components provided by a telecommunications network may monitor and/or measure the operations and transmission characteristics of the cell sites 110A-C and other network access components. For example, the network may provide a network monitoring system 140, via a network resource controller (NRC) or network performance and monitoring controller, or other network control component, in order to measure and/or obtain the data associated with the utilization of cell sites 110A-C when data is transmitted within the LTE telecommunications network.

These components may also perform various operations within the network, in order to optimize or modify operations of the cell sites 110A-C and the network. For example, the network monitoring system 140 may perform self-organizing network (SON) processes to modify, configure, and/or manage the cell sites 110A-C and other components of the network, as well as traffic management actions to reduce occurrences of low or congested data transmission throughput (e.g., congestion) at the cell sites 110A-C.

The computing environment includes a congestion determination system 150 that identifies and/or predicts occurrences of congestion at the cell sites 110A-C. As described herein, the congestion determination system 150 measures and/or obtains various data associated with the operation of cell sites 110A-C within an LTE network, and determines that cell sites are congested when the measured data satisfies (or, exceeds) various thresholds values associated with throughput congestion at the cell sites.

In some embodiments, the congestion determination system 150 may send instructions or provide information to a network modification system 160 that performs actions associated with modifying data traffic at cell sites or within an LTE network (e.g. suggestions for extra augmentation or expansion of a network), such as in response to occurrences or predictions of congestion at the cell sites. Further details regarding the operations and components of the congestion determination system 150 and the network modification system 160 are described herein.

FIG. 1 and the discussion herein provide a brief, general description of a suitable computing environment 100 in which the congestion determination system 150 can be supported and implemented. Although not required, aspects of the congestion determination system 150 are described in the general context of computer-executable instructions, such as routines executed by a general-purpose computer, e.g., mobile device, a server computer, or personal computer. The system can be practiced with other communications, data processing, or computer system configurations, including: Internet appliances, hand-held devices (including tablet computers and/or personal digital assistants (PDAs)), all manner of cellular or mobile phones, multi-processor systems, microprocessor-based or programmable consumer electronics, set-top boxes, network PCs, mini-computers, mainframe computers, and the like. Indeed, the terms "computer," "host," and "host computer," and "mobile device" and "handset" are generally used interchangeably herein, and refer to any of the above devices and systems, as well as any data processor.

Aspects of the system can be embodied in a special purpose computing device or data processor that is specifically programmed, configured, or constructed to perform one or more of the computer-executable instructions explained in detail herein. Aspects of the system may also be practiced in distributed computing environments where tasks or modules are performed by remote processing devices, which are linked through a communications network, such as a Local Area Network (LAN), Wide Area Network (WAN), or the Internet. In a distributed computing environment, program modules may be located in both local and remote memory storage devices.

Aspects of the system may be stored or distributed on computer-readable media (e.g., physical and/or tangible non-transitory computer-readable storage media), including magnetically or optically readable computer discs, hard-wired or preprogrammed chips (e.g., EEPROM semiconductor chips), nanotechnology memory, or other data storage media. Indeed, computer implemented instructions, data structures, screen displays, and other data under aspects of the system may be distributed over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme). Portions of the system reside on a server computer, while corresponding portions reside on a client computer such as a mobile or portable device, and thus, while certain hardware platforms are described herein, aspects of the system are equally applicable to nodes on a network. In an alternative embodiment, the mobile device or portable device may represent the server portion, while the server may represent the client portion.

In some embodiments, the mobile devices 130A-C and/or the cell sites 110A-C may include network communication components that enable the devices to communicate with remote servers or other portable electronic devices by transmitting and receiving wireless signals using a licensed, semi-licensed, or unlicensed spectrum over communications network, such as network 120. In some cases, the communication network 120 may be comprised of multiple networks, even multiple heterogeneous networks, such as one or more border networks, voice networks, broadband networks, service provider networks, Internet Service Provider (ISP) networks, and/or Public Switched Telephone Networks (PSTNs), interconnected via gateways operable to facilitate communications between and among the various networks. The communications network 120 may also include third-party communications networks such as a Global System for Mobile (GSM) mobile communications network, a code/time division multiple access (CDMA/TDMA) mobile communications network, a 3rd or 4th generation (3G/4G) mobile communications network (e.g., General Packet Radio Service (GPRS/EGPRS)), Enhanced Data rates for GSM Evolution (EDGE), Universal Mobile Telecommunications System (UMTS), or Long Term Evolution (LTE) network), or other communications network.

Further details regarding the operation and implementation of the congestion determination system 150 will now be described.

Examples of Determining Congestion at a Cell Site

Figure 2:
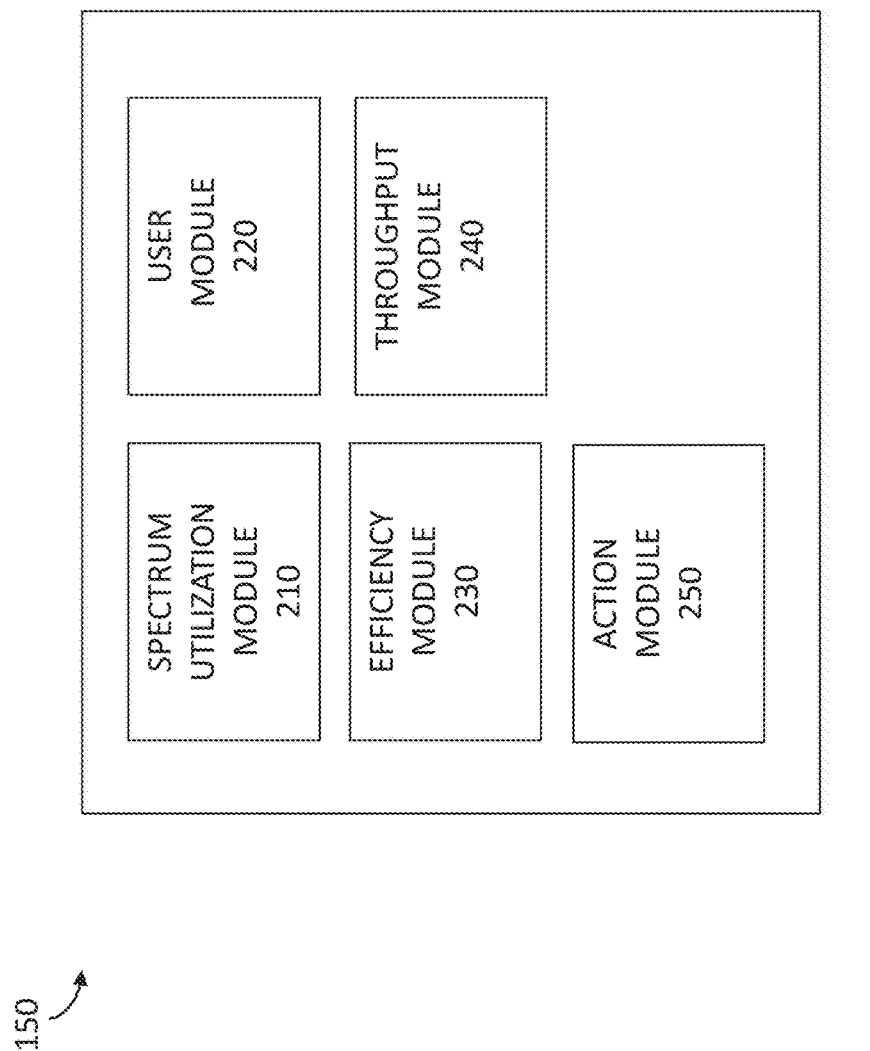
FIG. 2 is a block diagram illustrating components of a congestion determination system.

FIG. 2 is a block diagram illustrating components of the congestion determination system 150. The congestion determination system 150 may include functional modules that are implemented with a combination of software (e.g., executable instructions, or computer code) and hardware (e.g., at least a memory and processor). Accordingly, as used herein, in some examples a module is a processor-implemented module or set of code and represents a computing device having a processor that is at least temporarily configured and/or programmed by executable instructions stored in memory to perform one or more of the particular functions that are described herein. For example, the congestion determination system 150 may include a spectrum utilization module 210, a user module 220, a throughput module 230, an efficiency module 240, and an action module 250.

In some embodiments, the spectrum utilization module 210 is configured and/or programmed to measure a spectrum utilization percentage for physical resource blocks associated with a cell site of a telecommunications network, or one or more cell sectors of the cell site. A cell site may have multiple sectors, with antennas pointing in different directions at the cell site. For example, the spectrum utilization module 210 may determine or receive information from the cell sites 110A-C that identifies the number of PRBs utilized during current uplink or downlink data transmissions at the sites 110A-C.

Figure 3:
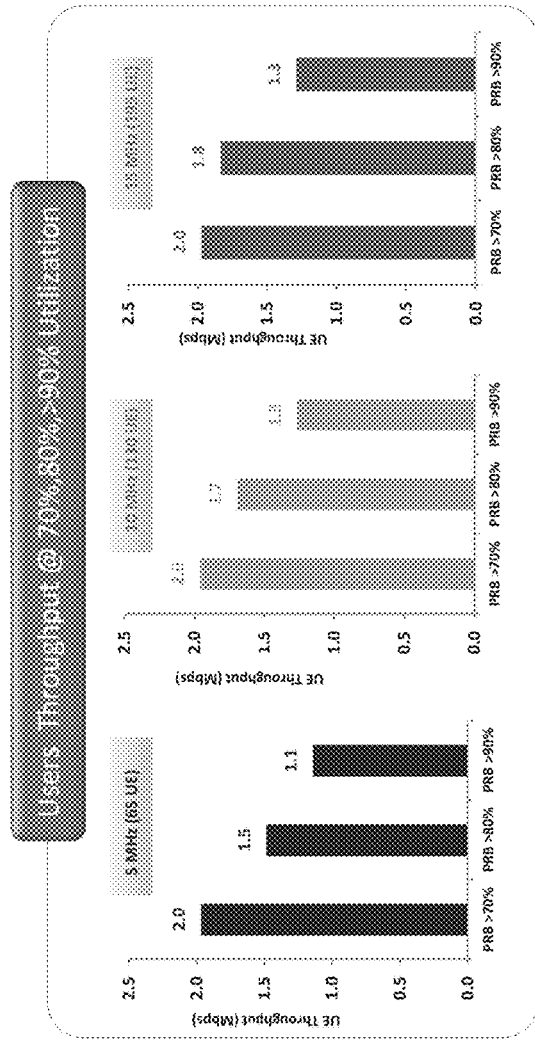
FIG. 3 is a diagram illustrating throughput at a cell site with respect to spectrum utilization parameters for the cell site.

FIG. 3 is a diagram 300 illustrating average user throughput at a cell site with respect to spectrum utilization parameters for the cell site. The diagram 300 shows the expected user throughput for a cell site at different frequency spectrums (e.g., 5 MHz, 10 Mhz, and 15 MHz), with respect to the utilization of PRBs available at the cell site. As depicted with respect to a 5 MHz spectrum, the expected or estimated throughput is 2.0 Mbps or higher when the spectrum utilization percentage (e.g., percentage of used PRBs) is 70 percent or lower, is 1.7 Mbps or lower when the spectrum utilization percentage is 80 percent or higher, and is 1.1 Mbps or lower when the spectrum utilization percentage is 90 percent or higher.

In some embodiments, the user module 220 is configured and/or programmed to measure or identify a number of users connected to the telecommunications network via the cell site. For example, the user module 220 may access the cell sites 110A-C or various network monitoring components (e.g., the network monitoring system 140) to access, receive, or obtain information identifying a number of users connected to the cell sites 110A-C and performing data transmissions via the cell sites 110A-C.

Figure 4:
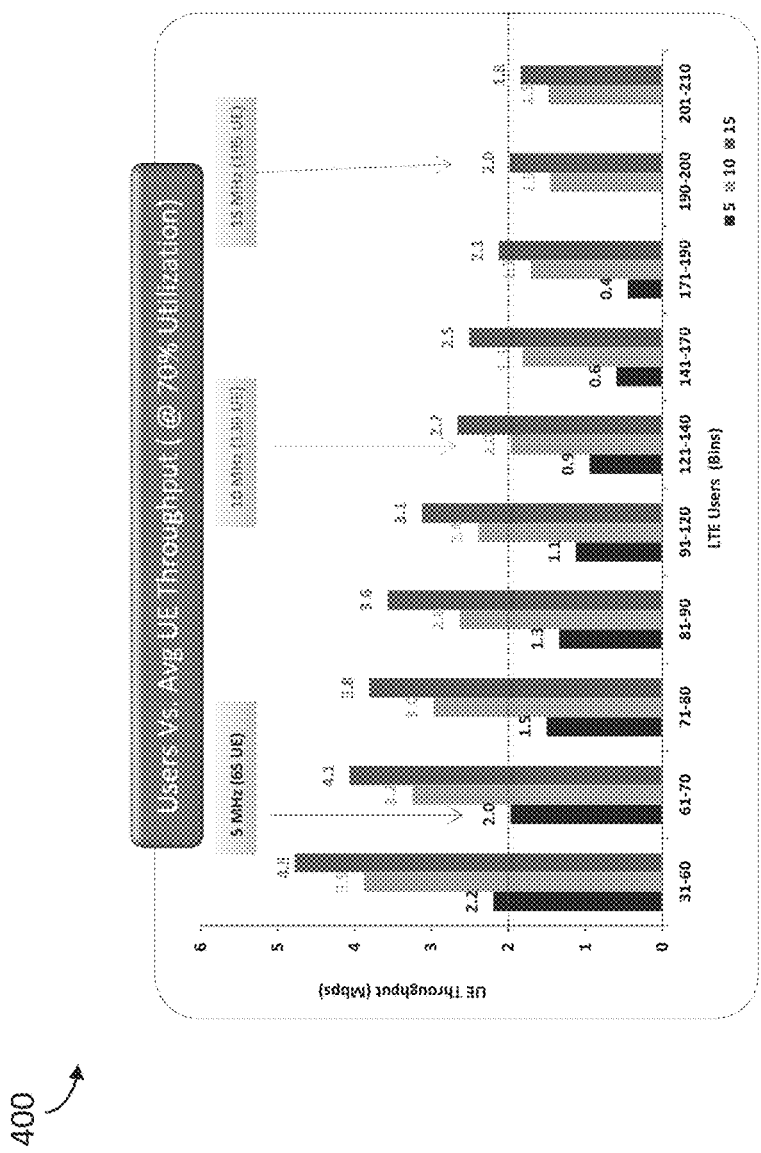
FIG. 4 is a diagram illustrating throughput at a cell site with respect to numbers of users at the cell site.

FIG. 4 is a diagram 400 illustrating throughput at a cell site with respect to numbers of users at the cell site. The diagram 400 shows the expected throughput for a cell site at different frequency spectrums (e.g., 5 MHz, 10 Mhz, and 15 MHz), with respect to the number of user connected to the cell site. As depicted with respect to a 10 MHz spectrum, the expected or estimated throughput is 2.0 Mbps or higher when the number of connected users is 130 users or lower, is 1.8 Mbps or lower when the number of connected users is 165 users or higher, and is 1.5 Mbps or lower when the number of connected users is 190 users or higher.

In some embodiments, the efficiency module 230 is configured and/or programmed to measure or identify a spectral efficiency of the cell site. For example, the efficiency module 230 may determine or receive information from the cell sites 110A-C that identifies their optimization potential, or spectral efficiency, within the network. The spectral efficiency refers to the maximum rate or throughput for a given bandwidth at a cell site.

Figure 5:
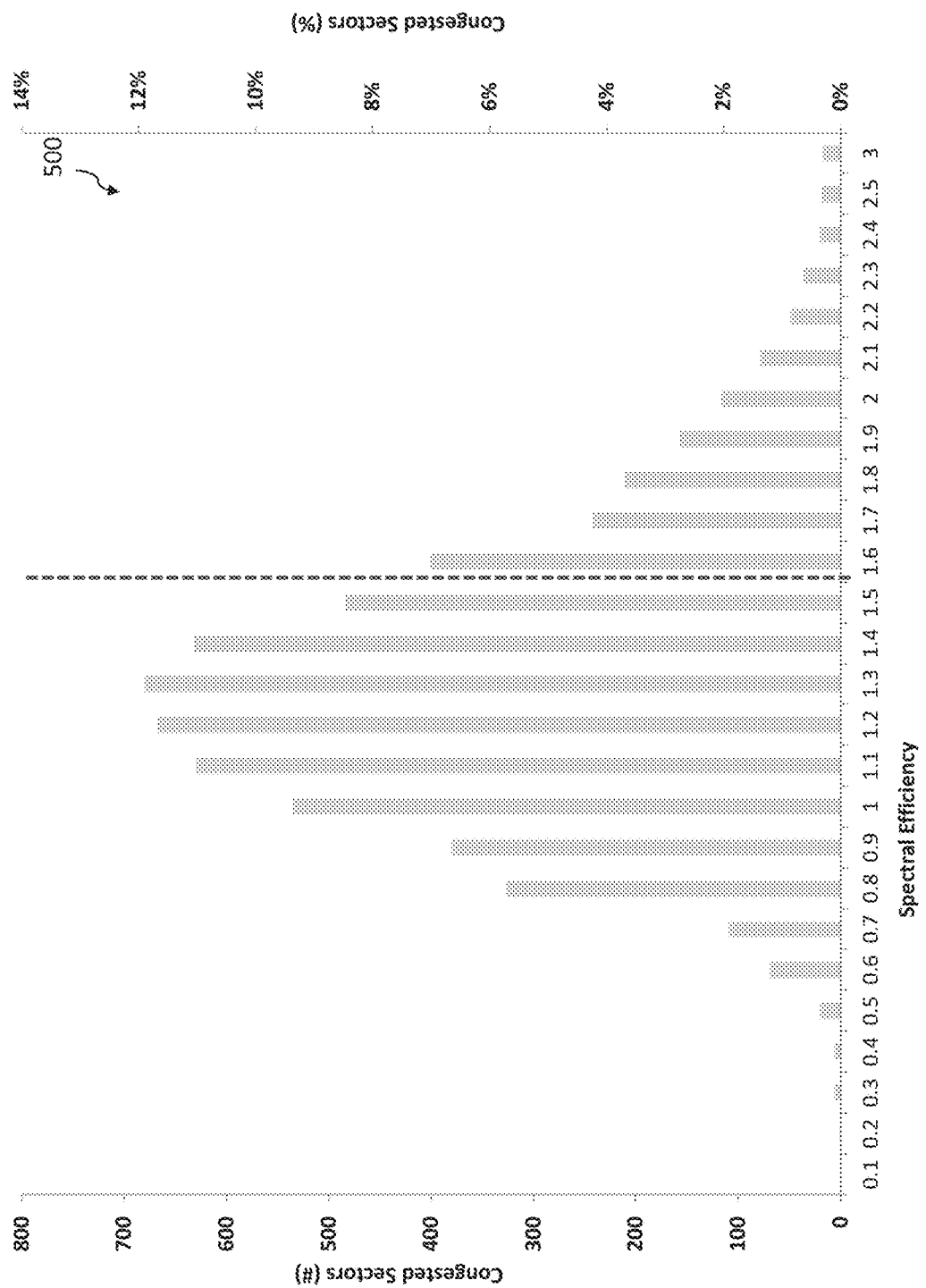
FIG. 5 is a diagram comparing congested sectors of a network to spectral efficiency of the network.

FIG. 5 is a diagram 500 comparing congested sectors of a network to spectral efficiency of the network. The diagram 500 shows the spectral efficiency (in bps/Hz) with respect to the number or percentage of congested sectors within a network. As depicted, a spectral efficiency of 1.5 bps/Hz can relate to a congested sector percentage of between 8 percent and 10 percent, and the network may be optimized for spectral efficiencies below 1.5 bps/Hz. The spectral efficiency may vary, depending on the efficiency of components within the network.

In some embodiments, the throughput module 240 is configured and/or programmed to determine the cell site is congested. As described herein, a cell site may be determined to be congested when the average user throughput at the cell site (e.g., at one or more sectors) is reduced or minimized with respect to increasing data transmissions via the cell site. Congestion, therefore, causes an average throughput at a cell site to go down.

The throughput module 240 may select or predetermine a level of throughput as a congestion level based on a variety of factors. For example, the level of congestion may be based on maintaining an average throughput capable of handling most high definition (HD) data transmissions, such as HD video transmissions. In such cases, the level of congestion may be selected or set at 2 Mbps or higher (e.g., to handle HD720p data traffic), may be selected or set at 4 Mbps or higher (e.g., to handle HD1080p data traffic), may be selected or set at 5 Mbps or higher (e.g., to handle an industry selected LTE "floor" of average throughput), and so on. Thus, in some cases, the throughput module 240 determines a cell site is congested based one of a number of different preset congestion levels for the average user throughput at the cell site.

The throughput module 240 may determine occurrences of congestion at the cell site when:

the spectrum utilization percentage for the physical resource blocks associated with the cell site is above a threshold percentage of spectrum utilization that is associated with congestion of the cell site;

the number of users connected to the telecommunications network via the cell site is above a threshold number of connected users based on the specific spectrum frequency and that is associated with congestion of the cell site; and/or the measured spectral efficiency of the cell site is above a threshold efficiency associated with congestion of the cell site and/or the network.

For example, the following table illustrates various threshold values for the measured data described herein that indicate an average throughput of 2 Mbps is maintained from a cell sector at a cell site:

TABLE 1

| Bandwidth | PRB Utilization | Connected Users | Spectral Efficiency |
| --- | --- | --- | --- |
| 5 MHz | >70% | 65 | >1.5 bps/Hz |
| 10 MHz | >70% | 130 | >1.5 bps/Hz |
| 15 MHz | >70% | 190 | >1.5 bps/Hz |
| 20 MHz | >70% | 260 | >1.5 bps/Hz |

Thus, Table 1 depicts various data value limits for characteristics of a cell sector at a cell site, that, when exceeded, indicate that the cell sector is congested (the user throughput is lower than expected).

Figure 6:
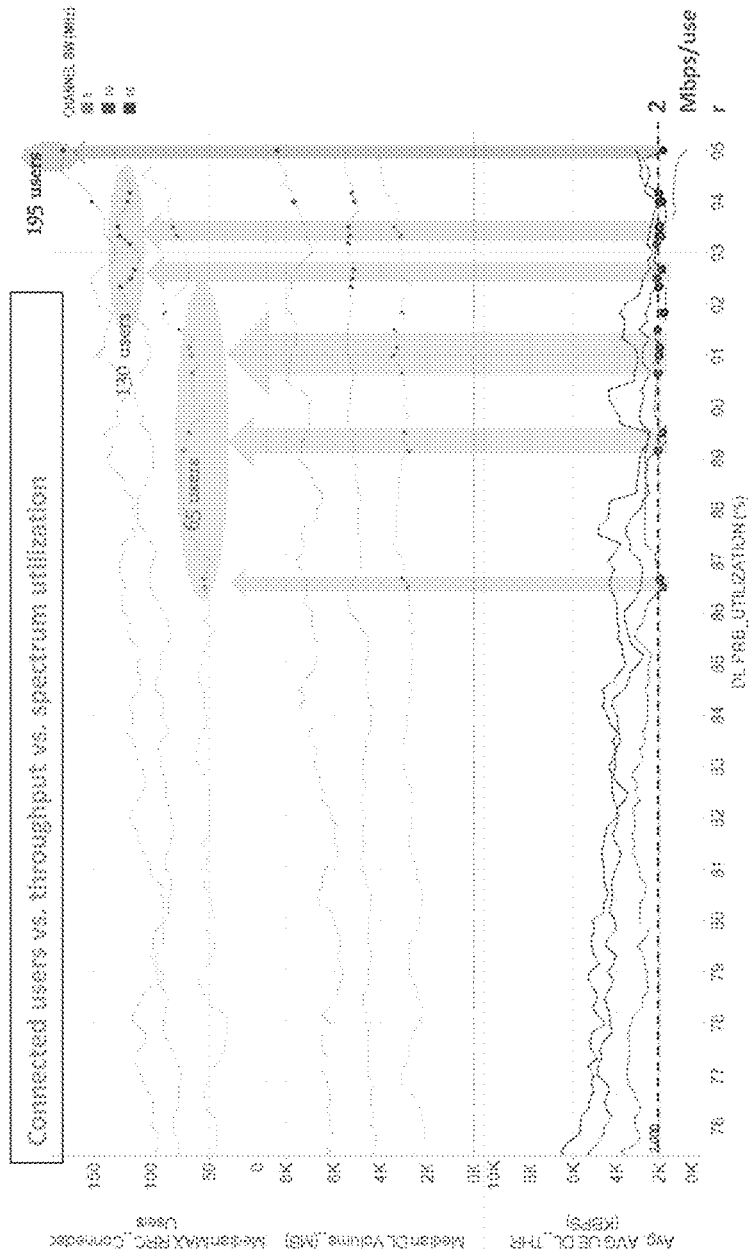
FIG. 6 is a diagram comparing spectrum utilization and number of connected users at a cell site to a determined throughput for the cell site.

FIG. 6 is a diagram 600 comparing spectrum utilization and number of connected users at a cell site to a determined average user throughput for the cell site. As depicted, in some embodiments, the throughput module 240 determines a cell sector of a cell site maintains a desired throughput of 2 Mbps when 65 or fewer users are connected to a 5 MHz channel, when 130 or fewer users are connected to a 10 MHz channel, and when 195 or fewer users are connected to a 15 MHz channel.

Referring back to FIG. 2, in some embodiments, the action module 250 is configured and/or programmed to perform an action associated with modifying operations of the cell site or the telecommunications network in response to the throughput module determining the cell site is congested. For example, the action module 250 may cause the network modification system 160 to perform various data traffic optimization techniques at the cell sector, cell site, or within the network to increase or improve the average throughput at the cell site.

Figure 7:
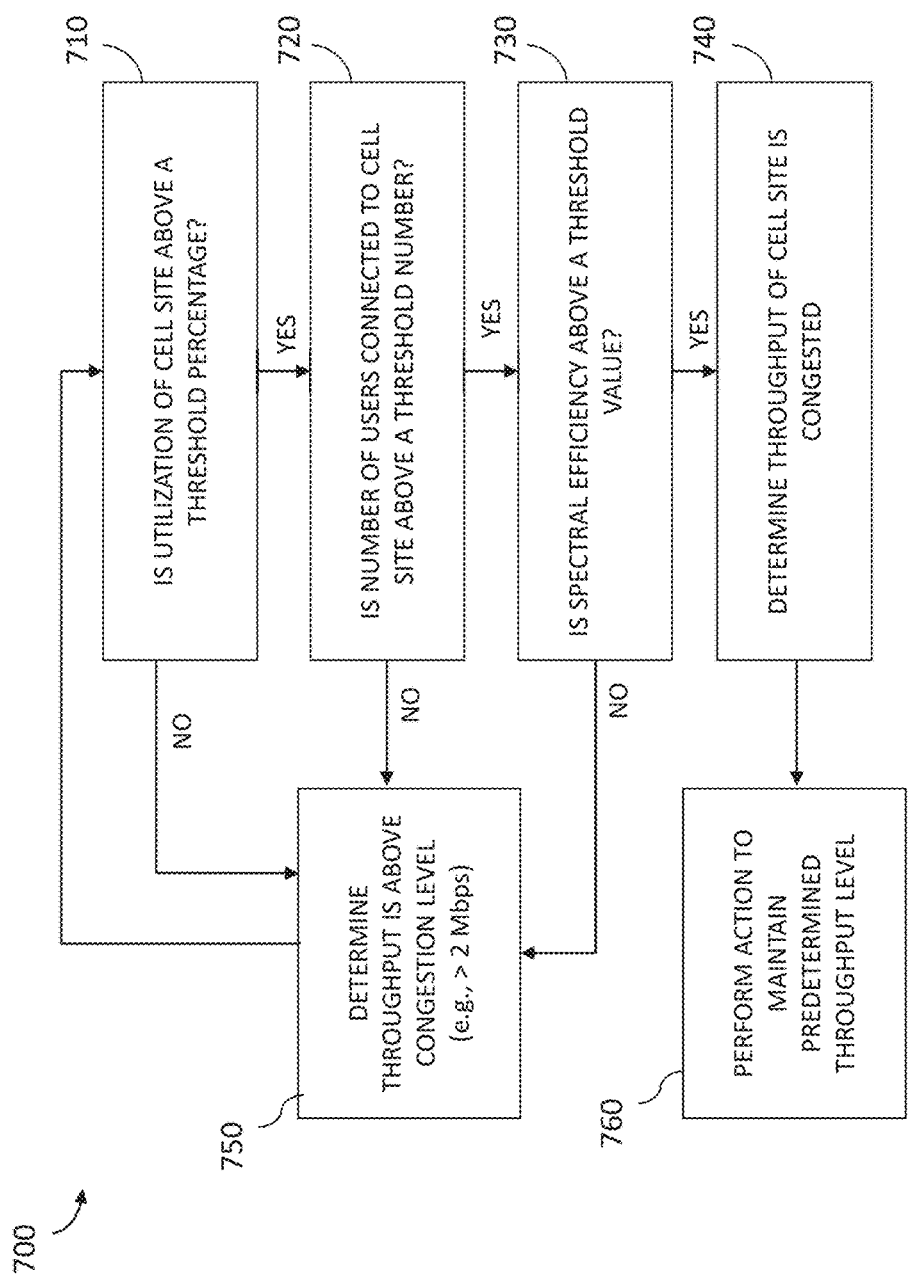
FIG. 7 is a flow diagram illustrating a method for determining whether a cell sector of a cell site is congested.

As described herein, in some embodiments, the congestion determination system 150 performs various algorithmic processes or methods in order to determine and/or identify occurrences of congestion at cell sites within an LTE network. FIG. 7 is a flow diagram illustrating a method 700 for determining the occurrence of congestion at a cell sector or cell site. The method 700 may be performed by the congestion determination system 150 and, accordingly, is described herein merely by way of reference thereto. It will be appreciated that the method 700 may be performed on any suitable hardware.

In operation 710, the congestion determination system 150 determines whether the spectrum utilization of a cell site is above a threshold percentage. For example, the congestion determination module 240 may obtain from the spectrum utilization module 210 information that identifies the number of PRBs utilized during data transmissions at the sites 110A-C.

When the spectrum utilization is above a threshold percentage, the congestion determination system 150 proceeds to operation 720, else the system 150 proceeds to operation 750, and determines the throughput at the cell site is above or at congestion levels (e.g., throughput is at or above 2 Mbps).

In operation 720, the congestion determination system 150 determines whether the number of users connected to the cell site is above a threshold number. For example, the congestion determination module 240 may obtain from the user module 220 information identifying a number of users connected to the cell sites 110A-C and performing data transmissions via the cell sites 110A-C.

When the number of connected users is above a threshold number, the congestion determination system 150 proceeds to operation 730, else the system 150 proceeds to operation 750, and determines the throughput at the cell site is above or at congestion levels (e.g., throughput is at or above 2 Mbps).

In operation 730, the congestion determination system 150 determines whether the spectral efficiency is above a threshold value. For example, the congestion determination module 240 may obtain from the efficiency module 230 information that identifies the maximum rate or throughput for a given bandwidth at the cell site.

When the spectral efficiency is above the threshold number, the congestion determination system 150 proceeds to operation 740, and determines the throughput of the cell site is congested (e.g., is below a predetermined throughput of 2 Mbps), else the else the system 150 proceeds to operation 750, and determines the throughput at the cell site is above or at congestion levels (e.g., throughput is at or above 2 Mbps).

Once the congestion determination system 150 determines a cell site is congested (in operation 750), the system 150, in operation 760, may perform an action to maintain the predetermined throughput. For example, the action module 250 may cause the network modification system 160 to perform various data traffic optimization techniques at the cell site or within the network to reduce the average throughput at the cell site.

As described herein, the congestion determination system 150 may use some or all the measured or obtained information described herein. For example, the congestion determination system 150 may determine a cell site is currently congested based on the results of operations 710 and 720.

As another example, the congestion determination system 150 may predict a cell site will be congested based on the results of operations 720 and 730. In such cases, the congestion determination system 150 may measure or obtain a number of users connected to a telecommunications network via a cell site, measure or obtain a spectral efficiency of the cell site, and determine or predict the cell site will be congested when the number of users connected to the telecommunications network via the cell site is above a threshold number of connected users that is associated with congestion of the cell site, and when the measured spectral efficiency of the cell site indicates an increase in data traffic via the cell site. The congestion determination system 150 may measure or obtain the spectral efficiency of a cell site to forecast changes in traffic profiles at a cell site or within a network, to dimension an LTE air interface capacity, and so on.

Thus, in some embodiments, the congestion determination system 150 utilizes information other than and different from directly measured throughput data to determine or predict a current or future throughput for one or more cell sites within an LTE network. Using the information, the congestion determination system 150 determines occurrences of congestion at cell sites, and performs actions to optimize or enhance the handling of data traffic by the cell sites, in order to avoid, prevent, or minimize the congestion at the cell site, providing users with suitable throughput for data transmissions.

Conclusion

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle specified number of items, or that an item under comparison has a value within a middle specified percentage range.

The above Detailed Description of examples of the technology is not intended to be exhaustive or to limit the technology to the precise form disclosed above. While specific examples for the technology are described above for illustrative purposes, various equivalent modifications are possible within the scope of the technology. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for", but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

What is claimed is:

1. A system, comprising:
   at least one hardware processor; and
   at least one hardware memory, coupled to the at least one hardware processor, wherein the memory stores software modules configured to be executed by the at least one processor, wherein the modules include:
      a first module that measures a number of factors, associated with a telecommunications network, and via a cell site within the network, wherein the factors include:
         (a) a number of users connected to the cell site,
         (b) a spectral efficiency of the cell site, and
         (c) a spectrum utilization percentage for resource blocks associated with the cell site; and,
      a second module that determines that the cell site is congested, or predicts the cell site will be congested, based on at least two of the factors (a) through (c).

2. The system of claim 1, further comprising:
   an action module that performs an action associated with modifying operations of the cell site in response to the second module determining the cell site is congested.

3. The system of claim 1, wherein the system determines that the cell site is congested, or predicts the cell site will be congested, without directly measuring throughput of the cell site by utilizing a test transmission of data sent via the cell site, and wherein the network is an LTE network.

4. The system of claim 1, wherein the cell site is determined to be congested when the spectrum utilization percentage for resource blocks associated with one or more cell sectors of the cell site and the number of users connected to the telecommunications network via the one or more cell sectors of the cell site indicate that an increase in data transmission via the one or more cell sectors of the cell site will result in a reduced throughput of data via the one or more cell sectors of the cell site.

5. The system of claim 1, wherein the cell site is determined to be congested when the spectrum utilization percentage for the resource blocks associated with one or more cell sectors of the cell site and the number of users connected to the telecommunications network via the one or more cell sectors of the cell site indicate that average user throughput at the one or more cell sectors of the cell site is less than 2 Mbps.

6. The system of claim 1, wherein a threshold percentage of spectrum utilization is based on a predetermined throughput value to be maintained at the one or more cell sectors of the cell site.

7. The system of claim 1, wherein a spectrum frequency of the cell site is normalized to 5 MHz; and
wherein the second module determines the cell site is congested when the spectrum utilization percentage for the resource blocks associated with one or more cell sectors of the cell site is above 70% spectrum utilization, and when the number of users connected to the telecommunications network via the cell site is above 65 total users.

8. The system of claim 1, wherein a threshold number of connected users is based on a predetermined throughput value to be maintained at the cell site.

9. The system of claim 1, wherein the system further comprises a third module to perform, or request to be performed, data traffic optimization techniques at the cell site, or within the network, to reduce average throughput at the cell site.

10. At least one non-transitory computer-readable storage medium whose contents, when executed by at least one data processor, executes operations, the operations comprising:
measuring factors associated with a telecommunications network via a cell site within the network,
wherein the factors include:
a number of users connected to the cell site,
a spectral efficiency of the cell site, and
a spectrum utilization percentage for resource blocks associated with the cell site; and
determining that the cell site is congested, or predicting the cell site will be congested, based on at least two of the factors.

11. The non-transitory computer-readable medium of claim 10, wherein a spectrum frequency of the cell site is 5 MHz, and wherein the cell site is predicted to be congested when the number of users connected to the network via one or more cell sectors of the cell site is above 65 total users, and when the spectral efficiency of the cell site is above 1.5 bps/Hz.

12. The non-transitory computer-readable medium of claim 10, wherein a threshold number of connected users is based on maintaining a predetermined average user throughput value at the cell site.

13. The non-transitory computer-readable medium of claim 10, further comprising:
performing an action associated with modifying operations of the cell site or the network in response to determining the cell site is congested.

14. The non-transitory computer-readable medium of claim 10, wherein the cell site is determined to be congested when spectrum utilization percentage for resource blocks associated with the cell site and the number of users connected to the telecommunications network via the cell site indicate that an increase in data transmission via the cell site will result in a reduced throughput of data via the cell site, and wherein determining that the cell site is congested, or will be congested, is performed without directly measuring throughput of the cell site by utilizing a test transmission of data sent via the cell site.

15. The non-transitory computer-readable medium of claim 10, wherein the cell site is associated with a specific spectrum frequency, wherein a threshold number of connected users associated with congestion of the cell site is based on the specific spectrum frequency, and wherein the network is an LTE network.

16. A computer-implementable method for use within a telecommunications network, the method comprising:
measuring multiple factors associated with the network via a cell site within the network,
wherein the factors include:
a number of users connected to the cell site,
a spectral efficiency of the cell site, and
a spectrum utilization percentage for resource blocks associated with the cell site; and
determining the cell site is congested, or predicting the cell site will be congested, based on at least two of the factors.

17. The method of claim 16, wherein a spectrum frequency of the cell site is 5 MHz, and wherein the cell site is predicted to be congested when the number of users connected to the network via one or more cell sectors of the cell site is above 65 total users, and when the spectral efficiency of the cell site is above 1.5 bps/Hz.

18. The method of claim 16, wherein a threshold number of connected users is based on maintaining a predetermined average user throughput value at the cell site.

19. The method of claim 16, further comprising:
performing an action associated with modifying operations of the cell site or the network in response to determining the cell site is congested.

20. The method of claim 16, wherein the cell site is associated with a specific spectrum frequency, and wherein a threshold number of connected users associated with congestion of the cell site is based on the specific spectrum frequency.

* * * * *